(12) United States Patent
Lee et al.

(10) Patent No.: US 12,403,753 B2
(45) Date of Patent: Sep. 2, 2025

(54) SEALING STRUCTURE OF ACTIVE WEATHER STRIP OF VEHICLE AND MANUFACTURING METHOD THEREOF

(71) Applicants: Hyundai Motor Company, Seoul (KR); Kia Corporation, Seoul (KR); Hwaseung R&A Co., Ltd., Gyeongsangnam-do (KR)

(72) Inventors: Myung-Hee Lee, Seoul (KR); Hyung-Sik Choi, Seoul (KR); Min-Han Ryu, Gyeonggi-do (KR); Jong-Seon Lee, Gyeonggi-do (KR); Hyun-Sung Nam, Seoul (KR); Jang-Kwon Kim, Gyeongsangnam-do (KR); Yoo-Geun Jeon, Gyeongsangnam-do (KR)

(73) Assignees: Hyundai Motor Company, Seoul (KR); Kia Corporation, Seoul (KR); Hwaseung R&A Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 18/232,140

(22) Filed: Aug. 9, 2023

(65) Prior Publication Data
US 2024/0317035 A1    Sep. 26, 2024

(30) Foreign Application Priority Data

Mar. 24, 2023   (KR) .................. 10-2023-0038493

(51) Int. Cl.
*B60J 10/244*    (2016.01)
*B60J 10/84*    (2016.01)

(52) U.S. Cl.
CPC ............. *B60J 10/244* (2016.02); *B60J 10/84* (2016.02)

(58) Field of Classification Search
CPC ................................ B60J 10/244; B60J 10/84
USPC ......................................................... 49/477.1
See application file for complete search history.

(56) References Cited

U.S. PATENT DOCUMENTS 2,180,960 A * 11/1939 Kennedy ............... F16L 41/088
                                                            285/286.1
3,178,779 A *  4/1965 Clark ......................... B64C 1/14
                                                              220/232
4,761,917 A *  8/1988 Knecht ................. E06B 7/2318
                                                               49/490.1

(Continued)

FOREIGN PATENT DOCUMENTS

CN          205930189 U  *  2/2017
CN          213291955 U  *  5/2021

(Continued)

*Primary Examiner* — Jason W San
(74) *Attorney, Agent, or Firm* — Fox Rothschild LLP

(57) ABSTRACT

A sealing structure of an active weather strip is arranged such that a nozzle resin is mounted in an air injection hole connected to an air chamber formed inside the weather strip in the shape of a closed type ring, and an air control module is connected to the nozzle resin through an air hose. In response to driving conditions of a vehicle, air is injected into or discharged from the air chamber inside the weather strip by an air control module to adjust a reaction force of the weather strip, so as to improve door closing characteristics and minimize an inflow of wind sounds while maintaining airtightness even at a high pressure.

14 Claims, 5 Drawing Sheets

(56) References Cited

U.S. PATENT DOCUMENTS

| | | | | |
|---|---|---|---|---|
| 4,924,629 | A * | 5/1990 | Smith | B60J 10/84 |
| | | | | 49/477.1 |
| 5,046,285 | A * | 9/1991 | Fratini, Jr. | B60J 10/244 |
| | | | | 49/477.1 |
| 5,361,542 | A * | 11/1994 | Dettloff | B60J 10/244 |
| | | | | 49/490.1 |
| 5,489,104 | A * | 2/1996 | Wolff | B60J 10/248 |
| | | | | 277/648 |
| 5,700,040 | A * | 12/1997 | Kujawski | F16L 37/0985 |
| | | | | 285/319 |
| 6,098,992 | A * | 8/2000 | Long | B60R 13/06 |
| | | | | 277/921 |
| 7,025,387 | B2 * | 4/2006 | Twardawski | F16L 5/027 |
| | | | | 285/414 |
| 7,862,090 | B1 * | 1/2011 | Foreman | F16L 37/244 |
| | | | | 285/280 |
| 10,696,147 | B2 * | 6/2020 | Baskar | B60J 10/244 |
| 11,845,324 | B2 * | 12/2023 | Lee | B60J 10/244 |
| 2005/0167980 | A1 * | 8/2005 | Bauer | F16L 37/1205 |
| | | | | 285/308 |
| 2021/0347238 | A1 * | 11/2021 | Oshima | B60J 10/86 |
| 2023/0158872 | A1 * | 5/2023 | Lee | B60J 10/244 |
| | | | | 49/477.1 |
| 2023/0158873 | A1 * | 5/2023 | Lee | B60J 10/244 |
| | | | | 49/477.1 |
| 2024/0317035 | A1 * | 9/2024 | Lee | B60J 10/244 |

FOREIGN PATENT DOCUMENTS

| | | | | |
|---|---|---|---|---|
| DE | 3336733 | A * | 4/1985 | B60J 10/21 |
| DE | 3729179 | A1 * | 3/1988 | |
| DE | 3729180 | A1 * | 3/1988 | |
| DE | 3729181 | A1 * | 3/1988 | |
| EP | 0330771 | A1 * | 9/1989 | |
| JP | 2020062986 | A * | 4/2020 | B60J 10/242 |
| KR | 10-2019-0070546 | A | 6/2019 | |

* cited by examiner

FIG. 2
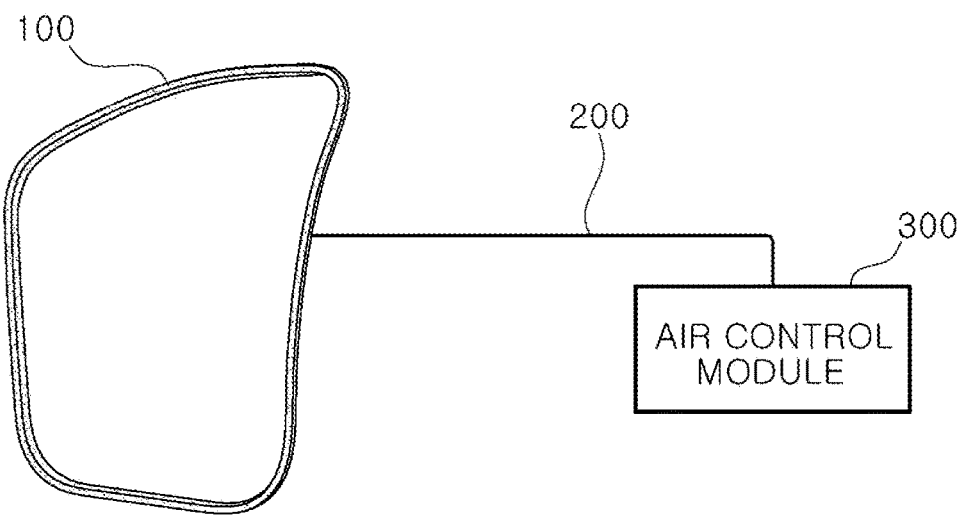
FIG. 3
FIG. 4
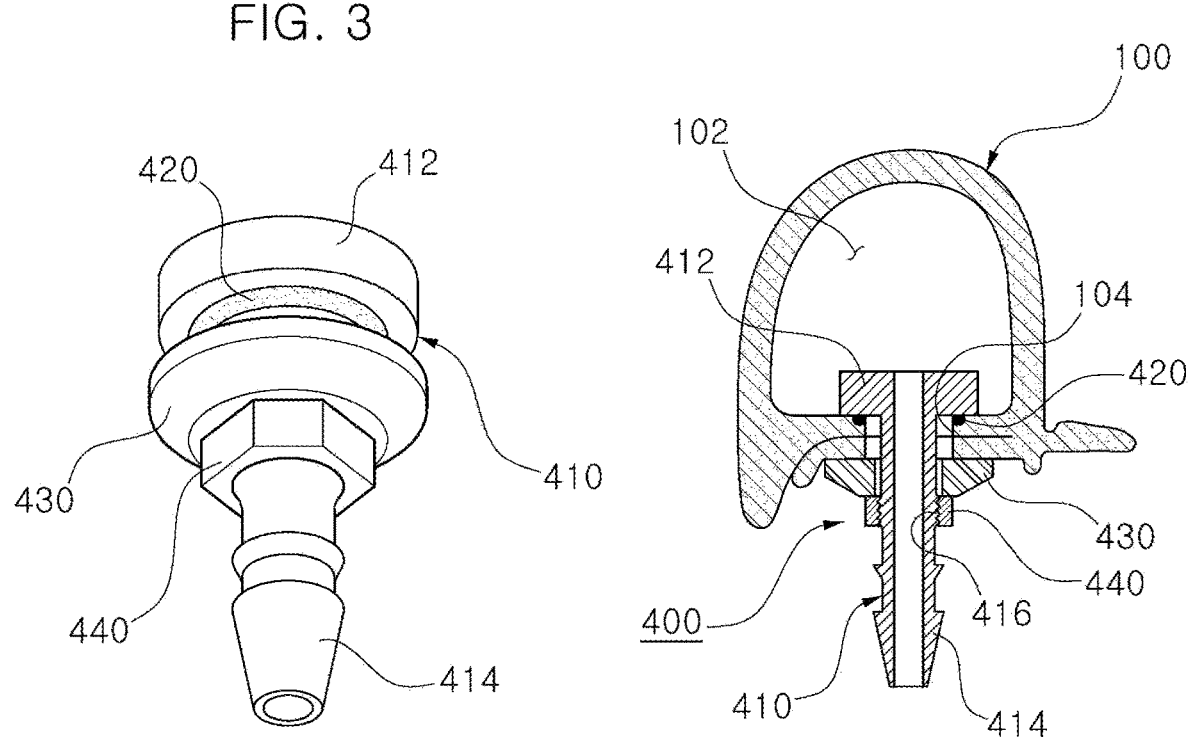

SEALING STRUCTURE OF ACTIVE WEATHER STRIP OF VEHICLE AND MANUFACTURING METHOD THEREOF

CROSS-REFERENCE TO RELATED APPLICATION

The present application claims under 35 U.S.C. § 119(a) the benefit of Korean Patent Application No. 10-2023-0038493, filed on Mar. 24, 2023, the entire contents of which are incorporated herein by reference.

BACKGROUND

(a) Technical Field

The present disclosure relates to a sealing structure of an active weather strip of a vehicle and a manufacturing method thereof, more specifically, to the sealing structure and the manufacturing method in which, when an inflow of wind sounds occurs during high-speed driving, a sealing gap between a door and a body of the vehicle is minimized so as to improve a reaction force of the active weather strip.

(b) Description of the Related Art

In general, a weather strip is disposed on a door inner panel to prevent foreign substances such as rainwater and dust from entering a vehicle compartment through a door glass.

Conventionally, as illustrated in FIG. 1 (RELATED ART), after drilling a clip hole in a door inner panel 10 using a laser, by coupling a clip mounted on a weather strip 12 to the clip hole in the door inner panel 10, the weather strip 12 has been placed on the door inner panel 10.

That is, the weather strip 12 has improved a closing force of a door by applying a clip hole (diameter 3 mm) at regular intervals (hole pitch 100 mm), and has improved wind sounds by partially applying a variable cross-section to the weather strip 12 to improve a reaction force thereof.

However, when a sealing gap changes, a reaction force of the weather strip 12 changes, making it difficult to obtain consistent quality of a door closure and an inflow blocking of wind sounds during high-speed driving.

In addition, as time goes by, aging hardening occurs in the cross-section of the weather strip 12, so it is difficult to maintain continuous door closing characteristics (sealability), and door closing characteristics and minimization of an inflow of wind sounds during driving cannot be satisfied simultaneously due to a contradictory nature therebetween.

SUMMARY

The present disclosure provides a sealing structure of an active weather strip of a vehicle and a manufacturing method thereof configured to maintain airtightness even at high pressure, so as to improve door closing characteristics and minimize an inflow of wind sounds by controlling a reaction force of the weather strip through an air injection or discharge operation.

A sealing structure of an active weather strip according to an embodiment of the present disclosure for solving the above technical problem may include a weather strip in which an air injection hole is formed on one side, and an air chamber is formed inside thereof; a nozzle resin mounted in the air injection hole; and an air control module which is connected to the nozzle resin through an air hose to control a reaction force of the weather strip by injecting air into or discharging air from the air chamber according to driving conditions of a vehicle.

As an exemplary embodiment, the weather strip may be a closed-type weather strip, and may be formed in the shape of a ring and formed as a single member over an entire length thereof.

As an exemplary embodiment, the nozzle resin may include a nozzle body which is attached (e.g., closely attached) to the weather strip so that one end of the nozzle body is inserted into the air injection hole, a washer inserted into an outer circumference of the nozzle body from another end of the nozzle body, and a fastening member which is fastened to the outer circumference of the nozzle body from the another end of the nozzle body and fixing the washer closely to an outer surface of the weather strip.

As an exemplary embodiment, the nozzle body may be formed in the shape of a T in which a head unit at one end thereof and a hose connection unit at the another end thereof are integrally formed.

As an exemplary embodiment, the head unit may be formed larger than an outer diameter of the hose connection unit and an inner diameter of the air injection hole, and may closely contact an edge of the air injection hole through a rubber ring inside the weather strip.

As an exemplary embodiment, a fastening surface unit may be formed on one side of an outer circumference of the hose connection unit in such a manner that the fastening member is fastened to the fastening surface.

As an exemplary embodiment, the air control module may maintain inside the air chamber of the weather strip at atmospheric pressure under low-speed driving conditions of the vehicle.

As an exemplary embodiment, the air control module may discharge air from the air chamber under conditions of opening and closing a door when the vehicle stops, and may maintain inside of the air chamber at a pressure lower than atmospheric pressure.

As an exemplary embodiment, the air control module may maintain inside of the air chamber at a high pressure by injecting air into the air chamber under high-speed driving conditions of the vehicle.

A vehicle may incorporate the above-described sealing structure of the active weather strip.

A sealing structure of an active weather strip according to another embodiment of the present disclosure may include a weather strip which is connected through a strip joint in which an air injection hole is formed, and having an air chamber formed inside thereof; a nozzle resin mounted in the air injection hole; and an air control module connected to the nozzle resin through an air hose to control a reaction force of the weather strip by injecting or discharging air into the air chamber according to driving conditions of a vehicle.

As an exemplary embodiment, the air control module may maintain inside of the air chamber of the weather strip at an atmospheric pressure under low-speed driving conditions of the vehicle.

As an exemplary embodiment, the air control module may maintain inside of the air chamber at a high pressure by injecting air into the air chamber under high-speed driving conditions of the vehicle.

As an exemplary embodiment, the weather strip may be formed in a single member except for the strip joint.

As an exemplary embodiment, the weather strip and the strip joint may be coupled by thermal fusion.

As an exemplary embodiment, the weather strip and the strip joint may be formed in the shape of a ring in which the air chamber is connected as one piece and is sealed.

Furthermore, a manufacturing method of a sealing structure of an active weather strip according to an embodiment of the present disclosure may include steps of: extruding a weather strip to a certain length in such a manner that an air chamber is formed inside the weather strip; forming an air injection hole to communicate with the air chamber on one side of the weather strip; protruding a hose connection unit of a nozzle body to the outside of the weather strip through the air injection hole in such a manner that a head unit formed on the nozzle body of a nozzle resin is caught on an inner surface of the weather strip; mounting the nozzle resin by fastening a washer and a fastening member to an outer circumference of the hose connection unit from outside of the weather strip; and coupling an end cross section portion of the weather strip by thermal fusion.

As an exemplary embodiment, the end cross section portion of the weather strip may have a shape of a ring in which the air chamber is connected as one piece and is sealed when coupled by thermal fusion.

As an exemplary embodiment, the air injection hole may be formed at the end cross section portion of the weather strip.

A manufacturing method of a sealing structure of an active weather strip according to another embodiment of the present disclosure may include steps of: extruding a weather strip and a strip joint to a certain length, respectively in such a manner that an air chamber is formed inside the weather strip; forming an air injection hole on one side of the strip joint to communicate with the air chamber; coupling one end cross section portion of the weather strip and one side of the strip joint by thermal fusion; protruding a hose connection unit of a nozzle body to the outside of the strip joint through the air injection hole so that a head unit formed on the nozzle body of a nozzle resin is caught on an inner surface of the strip joint; mounting the nozzle resin by fastening a washer and a fastening member to an outer circumference of the hose connection unit from an outside of the strip joint; and coupling another end cross section portion of the weather strip with another side of the strip joint by thermal fusion.

As an exemplary embodiment, the air chamber may be connected as one piece and is sealed when the weather strip and the strip joint are coupled by thermal fusion.

The present disclosure is the sealing structure and manufacturing method of an active weather strip wherein a nozzle resin is mounted in an air injection hole formed in the weather strip in the shape of a sealed ring, an air control module is connected to the nozzle resin through an air hose, and air is injected into or discharged from an air chamber of an inside of the weather strip to directly control a reaction force of the weather strip. It has effects of improving door closing characteristics and minimizing an inflow of wind sounds while maintaining airtightness even at a high pressure, and there are advantages of mass production.

BRIEF DESCRIPTION OF THE DRAWINGS

FIG. 2 is an exemplary view of a sealing structure of an active weather strip in which an air control module is connected to a closed-type weather strip of the present disclosure by an air hose.

FIG. 3 is a bottom perspective view of a nozzle resin of the present disclosure.

FIG. 4 is a cross-sectional view along a line IV-IV of FIG. 5(e) in which the nozzle resin of the present disclosure is mounted in an air injection hole of the weather strip.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMS, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
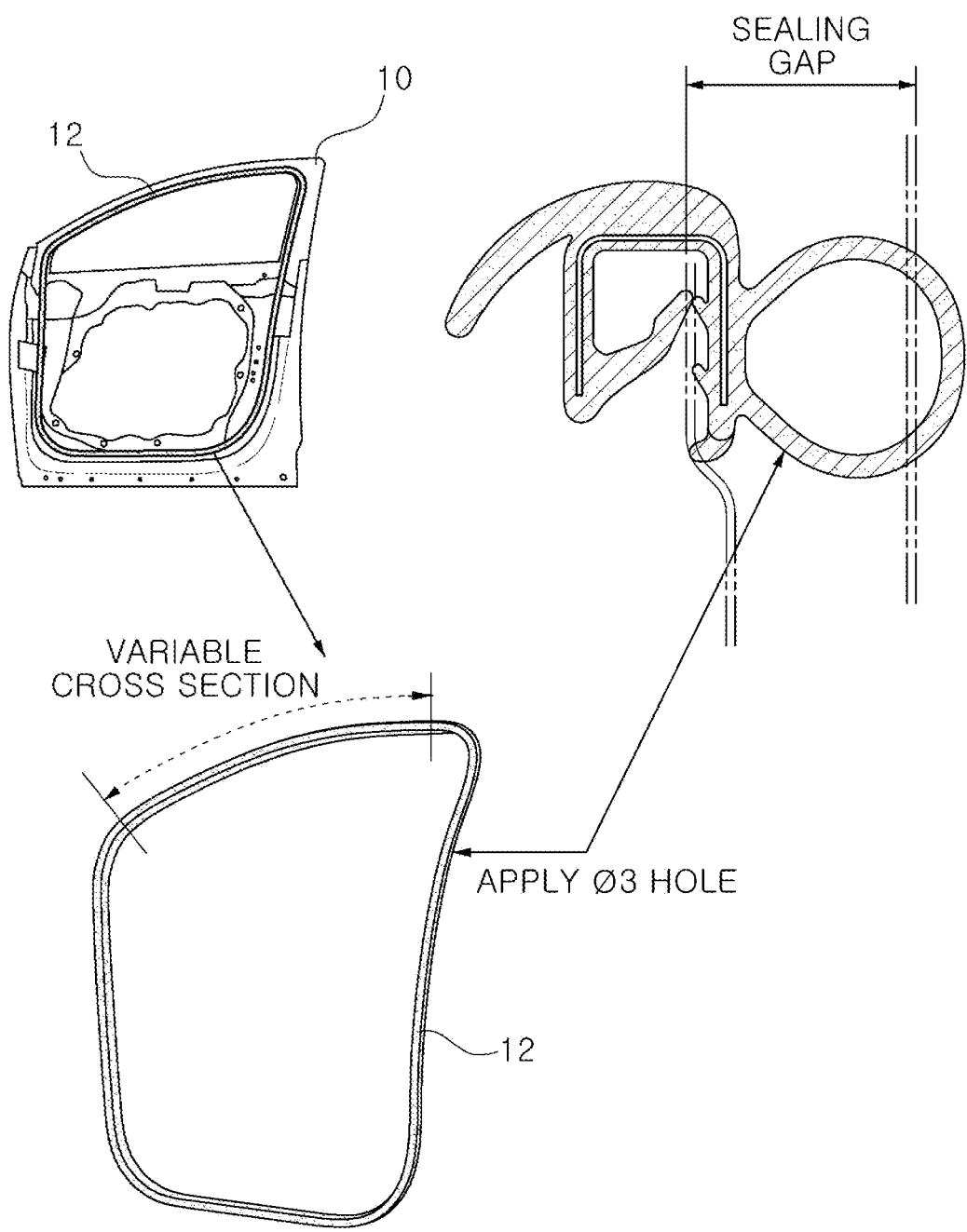
FIG. 1 (RELATED ART) is an exemplary view of a weather strip structure of the related art.
Figure 5:
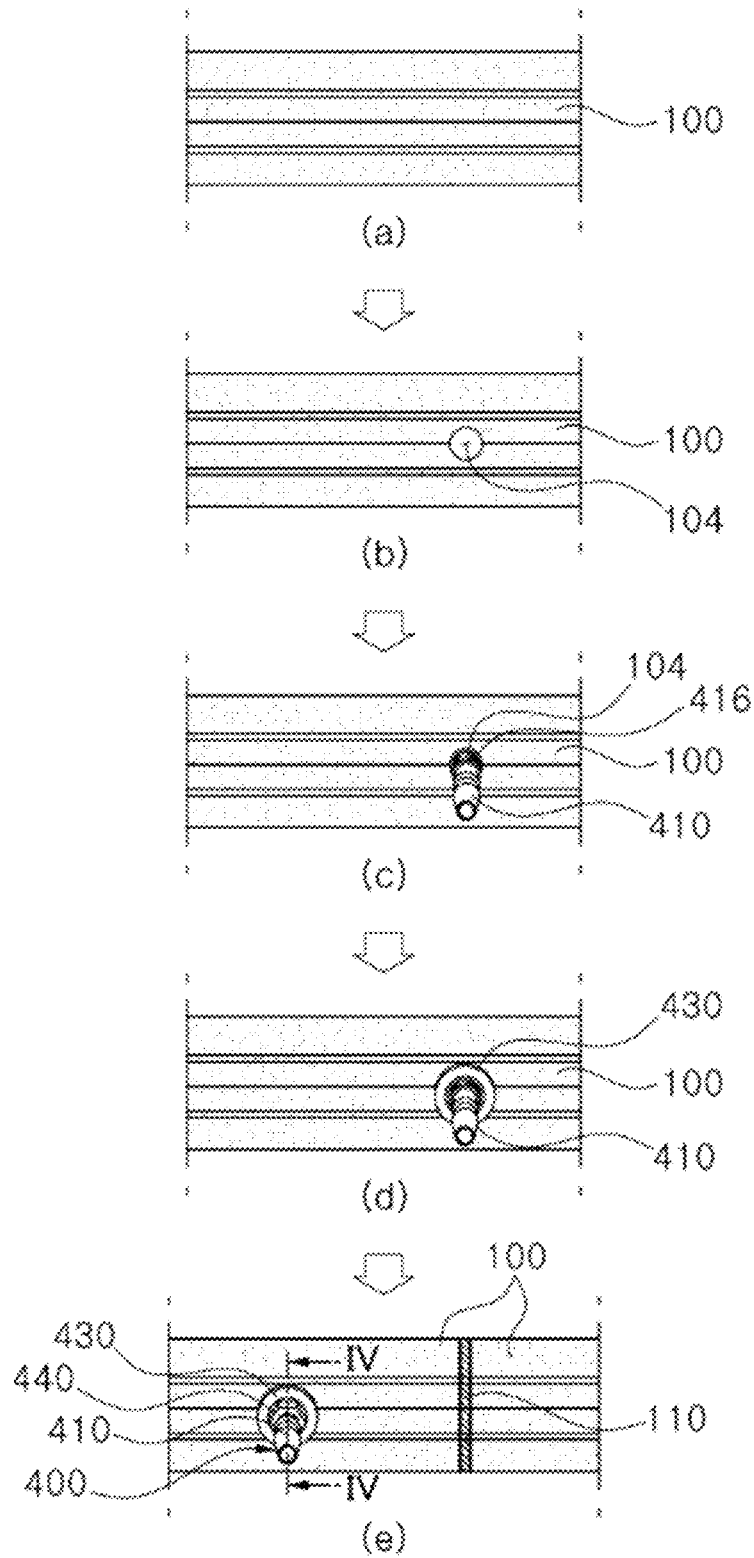
FIGS. 5a-5e are views illustrating a method of mounting the nozzle resin of the present disclosure to the weather strip.
Figure 6:
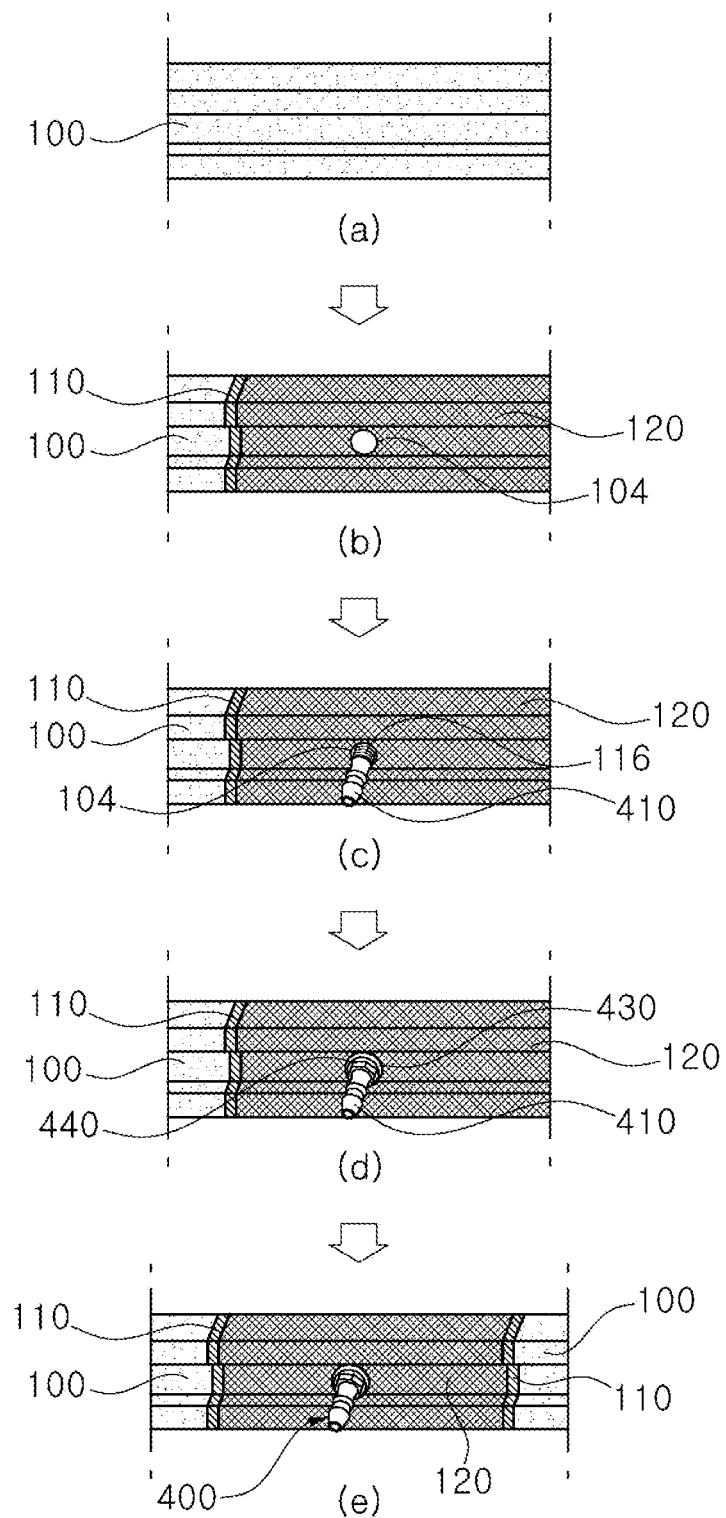
FIG. 6 is a view illustrating the method of mounting the nozzle resin of the present disclosure to the weather strip through a strip joint formed with the air injection hole.
Figure 7:
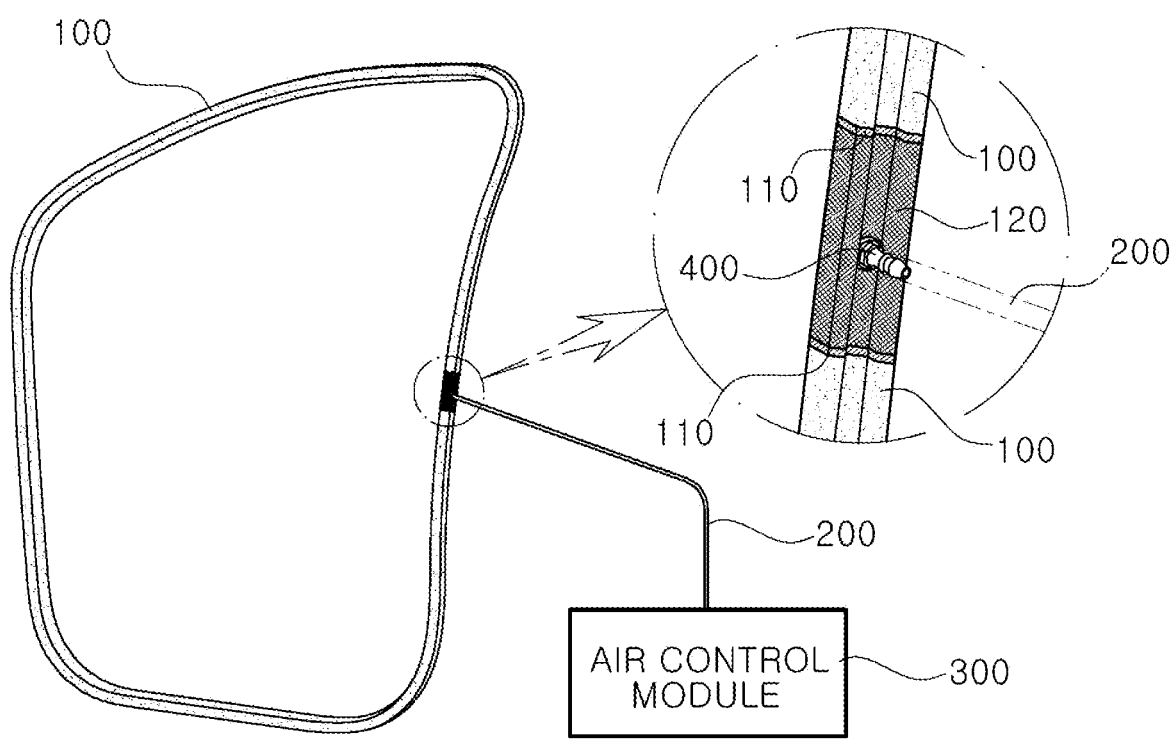
FIG. 7 is an exemplary view in which the air hose is connected to the strip joint of the weather strip of the present disclosure through the nozzle resin.

Hereinafter, in order to fully understand the present disclosure, a preferred embodiment of the present disclosure will be described with reference to FIGS. 2 to 7. The embodiments of the present disclosure may be modified in various forms, and the scope of the present disclosure should not be construed as being limited to the embodiments described in detail below. It should be noted that the same configuration in each drawing is sometimes illustrated with the same reference numerals. Detailed descriptions of known functions and configurations determined to unnecessarily obscure the gist of the present disclosure will be omitted.

A sealing structure of an active weather strip according to an embodiment of the present disclosure may be composed of a weather strip 100, an air hose 200, an air control module 300, and a nozzle resin 400.

That is, the weather strip 100 may be composed of a closed-type ring form in which an air chamber 102 is formed inside thereof, or closed-type ring form in which the air chamber 102 is formed inside thereof while being connected through a strip joint 120. Here, a closed-type ring form means that the weather strip 100 is formed in a ring shape whose air chamber 102 is connected as one piece and is sealed.

In this case, the weather strip 100 may be formed in a shape of a ring and integrally formed over an entire length thereof, and when the strip joint 120 is applied, the rest of the portion of the weather strip 100 may be integrally formed except for the strip joint 120.

An air injection hole 104 may be formed on one side of the weather strip 100 or one side of the strip joint 120.

It is preferable that the air injection hole 104 is coupled by thermal fusion when directly connected to one side end of the air hose 200.

In addition, it is preferable that the air injection hole 104 is connected through the nozzle resin 400 when indirectly connected to one end of the air hose 200.

It is preferable that the strip joint 120 is coupled by thermal fusion in a state where the strip joint 120 corresponds to an end cross-section unit 110 of the weather strip 100.

One end of the air hose 200 may be directly connected to the air injection hole 104 or indirectly connected through the nozzle resin 400, and the other end of the air hose 200 may be connected to the air control module 300.

The air control module 300 may serve to control a reaction force of the weather strip 100 by injecting air into or discharging air from the air chamber 102 through the air hose 200 according to driving conditions of a vehicle.

For example, the air control module 300 may maintain inside of the air chamber 102 of the weather strip 100 at atmospheric pressure under low-speed driving conditions of the vehicle; when the vehicle stops, in the conditions of opening and closing a door, air may be discharged from the air chamber 102 and inside of the air chamber 102 may be maintained at lower pressure than atmospheric pressure; and in high-speed driving conditions of the vehicle, air may be injected into the air chamber 102 and inside of the air chamber 102 may be maintained at a high pressure to control the reaction force of the weather strip 100, respectively. In particular, the air chamber 102 may improve door closing characteristics and minimize an inflow of wind sounds while maintaining airtightness even at a high pressure.

The nozzle resin 400 may include a nozzle body 410 with one end being inserted into the air injection hole 104 and closely contacted to an inner surface of the weather strip 100 through a rubber ring 420; a washer 430 fitted to an outer circumference of the nozzle body 410 at the other end of the nozzle body 410; and a fastening member 440 that is fastened to the outer circumference of the nozzle body 410 and fixing the washer 430 closely to an outer surface of the weather strip 100.

In this case, the nozzle body 410 may be formed in the shape of a T in which a head unit 412 of one end thereof and a hose connection unit 414 of the other end thereof are integrally formed. The head unit 412 may be formed larger than an outer diameter of the hose connection unit 414 and an inner diameter of the air injection hole 104 and closely contact an edge of the air injection hole 104 through the rubber ring 420 inside the weather strip 100, the hose connection unit 414 may serve to support the washer 430, the fastening member 440, and the air hose 200 to be sequentially connected outside of the weather strip 100.

On one side of an outer circumference of the hose connection unit 414, a fastening surface unit 416 may be formed in such a manner that the fastening member 440 is fastened thereto, and the fastening surface unit 416 may be configured in the shape of a male screw, and the fastening member 440 may be configured in the shape of a nut. Furthermore, a manufacturing method of an active weather strip according to an embodiment of the present disclosure may include steps of extruding a weather strip 100 to a certain length so that the air chamber 102 is formed inside thereof; forming an air injection hole 104 to communicate with the air chamber 102 on one side of the weather strip 100; protruding a hose connection unit 414 of a nozzle body 410 to outside of the weather strip 100 through an air injection hole 104 so that a head unit 412 formed on a nozzle body 410 of a nozzle resin 400 is caught on the inner surface of the weather strip 100; mounting the nozzle resin 400 by fastening the washer 430 and a fastening member 440 to an outer circumference of the hose connection unit 414 from outside of the weather strip 100; and coupling an end cross section unit 110 of the weather strip 100 by thermal fusion.

In this case, the end cross-section portion 110 of the weather strip 100 may be configured in the shape of a ring in which the air chamber 102 is connected as one piece and is sealed when coupled by thermal fusion.

It is preferable that the air injection hole 104 is formed in the end cross section portion 110 of the weather strip 100.

In addition, a manufacturing method of the active weather strip according to another embodiment of the present disclosure may include steps of: extruding a weather strip 100 and a strip joint 120 to have a certain length in such a manner that an air chamber 102 is formed inside thereof; forming an air injection hole 104 to communicate with the air chamber 102 on one side of the strip joint 120; coupling one end cross-section portion 110 of the weather strip 100 and one side of the strip joint 120 by thermal fusion; protruding a hose connection unit 414 of the nozzle body 410 to the outside of the strip joint 120 through the air injection hole 104 so that a head unit 412 formed on the nozzle body 410 of a nozzle resin 400 is caught on the inner surface of the strip joint 120; mounting the nozzle resin 400 by fastening a washer 430 and a fastening member 440 to the outer circumference of the hose connection unit 414 from the outside of the strip joint 120; and coupling the other end cross-section portion 110 of the weather strip 100 and the other side of the strip joint 120 by thermal fusion.

In this case, when the weather strip 100 and the strip joint 120 are coupled by thermal fusion, the air chamber 102 may be connected as one piece and has the shape of a closed-type ring.

As such, in the present disclosure, a nozzle resin 400 may be mounted in an air injection hole 104 formed in a weather strip 100 in the form of a closed-type ring, an air control module 300 may be connected to the nozzle resin 400 through an air hose 200 to inject air into or discharge air from an air chamber 102 of inside the weather strip 100 to directly control a reaction force of the weather strip 100, which has advantages of improving door closing characteristics, minimizing an inflow of wind sounds, and being easy in mass production while maintaining airtightness even at a high pressure.

Furthermore, the present disclosure is not limited to the above-described embodiment, but can be modified and transformed without departing from the gist of the present disclosure, and the technical idea to which such modification and transformation is applied should also be considered to fall within the following patent claims.

What is claimed is:

1. A sealing structure of an active weather strip of a vehicle, the sealing structure comprising:
    the weather strip in which an air injection hole is formed on one side, and an air chamber is formed inside the weather strip;
    a nozzle resin mounted in the air injection hole; and
    an air control module which is connected to the nozzle resin through an air hose to control a reaction force of the weather strip by injecting air into or discharging air from the air chamber according to driving conditions of the vehicle;
    wherein the nozzle resin includes a nozzle body having a head unit at one end inserted into the air injection hole and a hose connection unit at another end;
    wherein a fastening surface unit in the shape of a male screw is formed on one side of an outer circumference of the hose connection unit and is fastened to a fastening member in the shape of a nut; and
    wherein the head unit is in contact with an edge of the air injection hole through a rubber ring inside the weather strip.

2. The sealing structure of claim 1, wherein the weather strip is a closed-type weather strip formed in a shape of a ring and formed as a single member over an entire length of the weather strip.

3. The sealing structure of claim 1, wherein the nozzle resin further comprises:
    a washer inserted into an outer circumference of the nozzle body from another end of the nozzle body;
    wherein the fastening member is fastened to an outer circumference of the nozzle body from the another end of the nozzle body and fixes the washer to an outer surface of the weather strip.

4. The sealing structure of claim 3, wherein the nozzle body is formed in the shape of a T and the head unit and the hose connection unit are integrally formed.

5. The sealing structure of claim 4, wherein the head unit is formed larger than an outer diameter of the hose connection unit and an inner diameter of the air injection hole.

6. The sealing structure of claim 1, wherein the air control module maintains inside the air chamber of the weather strip at atmospheric pressure under low-speed driving conditions of the vehicle.

7. The sealing structure of claim 1, wherein the air control module discharges air from the air chamber under conditions of opening and closing a door when the vehicle stops, and maintains inside of the air chamber at a pressure lower than atmospheric pressure.

8. The sealing structure of claim 1, wherein the air control module maintains inside of the air chamber at a high pressure by injecting air into the air chamber under high-speed driving conditions of the vehicle.

9. A vehicle comprising the sealing structure of the active weather strip of claim 1.

10. A sealing structure of an active weather strip, the sealing structure comprising:
    the weather strip which is connected through a strip joint in which an air injection hole is formed, and having an air chamber formed inside the weather strip;
    a nozzle resin mounted in the air injection hole; and
    an air control module connected to the nozzle resin through an air hose to control a reaction force of the weather strip by injecting or discharging air into the air chamber according to driving conditions of a vehicle;
    wherein the nozzle resin includes a nozzle body having a head unit at one end inserted into the air injection hole and a hose connection unit at another end;
    wherein a fastening surface unit in the shape of a male screw is formed on one side of an outer circumference of the hose connection unit and is fastened to a fastening member in the shape of a nut; and
    wherein the head unit is in contact with an edge of the air injection hole through a rubber ring inside the weather strip.

11. The sealing structure of claim 10, wherein the air control module maintains inside the air chamber of the weather strip at an atmospheric pressure under low-speed driving conditions.

12. The sealing structure of claim 10, wherein the air control module maintains inside of the air chamber at a high pressure by injecting air into the air chamber under high-speed driving conditions of a vehicle.

13. The sealing structure of claim 10, wherein the weather strip and the strip joint are coupled by thermal fusion.

14. The sealing structure of claim 10, wherein the weather strip and the strip joint are formed in the shape of a ring in which the air chamber is connected as one piece and is sealed.

* * * * *